Jan. 24, 1950  A. C. ARBOGAST  2,495,622
PIPE JOINT
Original Filed Feb. 3, 1947

INVENTOR.
ALFRED C. ARBOGAST
BY
Whittemore, Hulbert
& Belknap
ATTORNEYS

Patented Jan. 24, 1950

2,495,622

UNITED STATES PATENT OFFICE 2,495,622

PIPE JOINT

Alfred C. Arbogast, Elkhart, Ind., assignor to Northern Indiana Brass Company, Elkhart, Ind., a corporation of Indiana Original application February 3, 1947, Serial No. 726,041. Divided and this application January 19, 1948, Serial No. 3,102

5 Claims. (Cl. 285—194)

The present invention relates to apparatus for effecting joints between tubular members or pipes.

The present application is a division of my prior copending application Serial No. 726,041 filed February 3, 1947.

In my prior copending applications, Serial Nos. 691,959 and 691,960 filed August 21, 1946, now abandoned, there is disclosed a method of effecting pipe joints which comprises essentially the provision of a tubular fitting over abutting ends of two pipe sections, in which the space between the abutting ends of the pipe fittings and the space between the outer surface of the ends of the pipe fittings and the inner surface of the tubular fitting is such as to effect capillary flow of molten metal between the said surfaces. This metal may be provided as a solder or brazing metal or it may be provided by melting the material of the ring so as to effect a weld. In either case the flow of the melted metal continues throughout the extent of the aforesaid spaces and terminates at their edges so that in the final product the interior of the pipe joint is substantially smooth. Thus there is avoided the provision of projections inwardly into the path of flow of material in the pipe and at the same time there is avoided the provision of recesses or cavities at the joint in which material could accumulate. As pointed out in the prior applications, Serial Nos. 691,959 and 691,960, the invention is particularly useful in connection with thin-walled tubing.

In order that capillary flow shall take place between the aforesaid spaces in the manner referred to, it is essential that the spaces between the said surfaces shall be rather closely maintained as to tolerance. It is found in practice that tubes of stainless steel, Monel, inconel, nickel and the like have commercial tolerances such that it is impossible to provide continuous rings which will in all cases interfit with the outer surfaces of the tubes in a manner which will effect capillary flow of melted metal therebetween.

In accordance with the present invention, there is substituted for the continuous ring a split clamping ring which may be tightened down upon the ends of the tubes so as to interfit therewith in a manner which will provide for capillary flow of melted metal therebetween.

It is an object of the present invention to provide apparatus for effecting a capillary flow of melted metal in producing tube joints, even though the outer diameter of the tubes being joined may vary substantially.

It is a further object of the present invention to provide a split ring for the purpose referred to which facilitates the centering or aligning of the ring directly over the butt joint between the ends of pipe sections to be joined.

It is a further object of the present invention to provide means for effecting tube joints of the type referred to which are also useful in the preliminary assembly of sections of tubing.

It is a further object of the present invention to provide a split ring for the purpose described which is modified so as to provide a stronger joint between the split ends thereof in the completed product.

It is a further object of the present invention to provide apparatus for effecting a tight clamping of a split ring over the abutting ends of pipe sections which includes means for tightening the split ring on the pipe sections, which means may be removed after completion of the joint to improve the appearance thereof.

Other objects and features of the invention will become apparent as the description proceeds, especially when taken in conjunction with the accompanying drawings, wherein.

Figure 1:
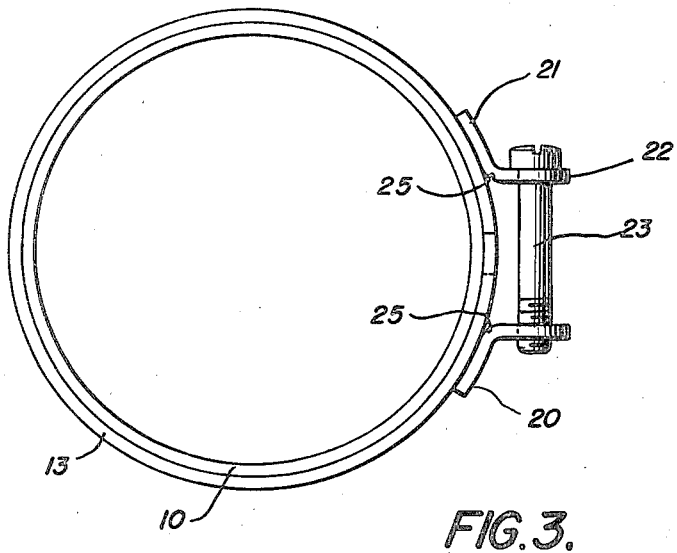
Figure 1 is an end elevation of a pipe joint produced in accordance with the present invention.
Figures 2, 3:
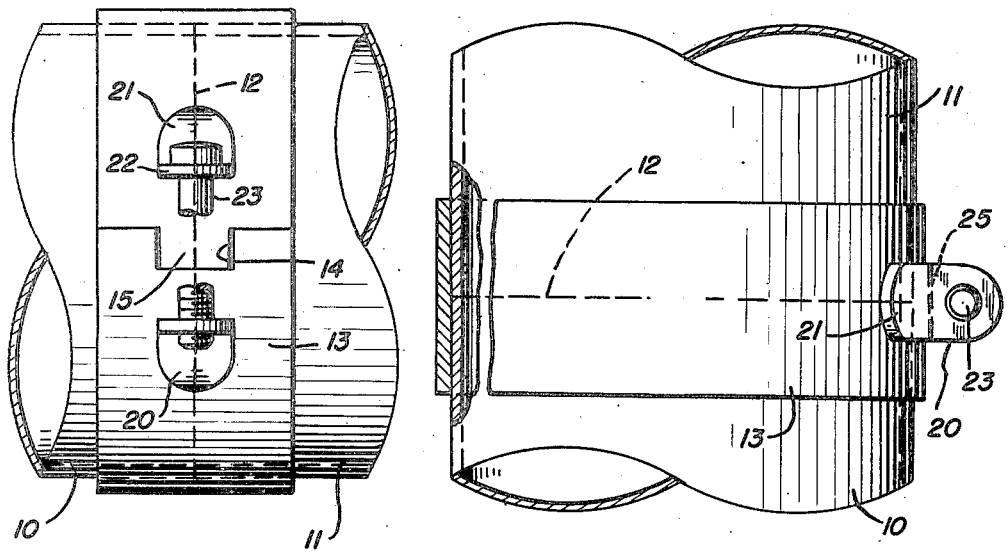
Figure 2 is a side elevation as seen from the right in Figure 1.
Figure 3 is a bottom plan view of the structure shown in Figure 1.

Referring to the figures, there is illustrated a joint effected between pipe sections 10 and 11 which are in end abutting relation, the abutment between the ends of the pipe sections 10 and 11 being along the line 12 as seen in Figure 3. Directly over the line of abutment 12 and centered or aligned with respect thereto is a split clamping ring 13. As best seen in Figure 2, one end of the clamping ring 13 is provided with a recess 14 and the opposite end of the clamping ring 13 is provided with a tongue 15 which is received and closely fits within the recess 14. As disclosed in my prior applications, Serial Nos. 691,959 and 691,960, and as shown in the drawing, the metal is preferably of substantially the same thickness as the thin-walled tubing.

Adjacent the ends of the split ring 13 are clamping members indicated generally at 20 which have portions 21 welded, brazed or otherwise permanently secured to the material of the ring 13 and which have outstanding ears 22. A clamping screw 23 is provided which extends to an opening in one of the ears 22 and which is threadedly received within the other of said ears. The clamping screw 23 serves to draw the ears 22 together so as to effect a firm clamping by the split ring 13 on the ends of the tubes 10 and 11.

The provision of the split ring as above defined permits the formation of a joint by the capillary flow of melted metal as described in my prior copending applications, even though the adjacent ends of the tubes 10 and 11 may be of appreciably different outside diameter. It further has the effect of insuring exact alignment of the ends of the pipe sections and corrects or overcomes any ovality which may exist therein. Within the limits of commercial tolerances, the provision of the split ring permits the formation of the joint by the capillary flow of metal as previously outlined.

The ring 13 is a permanent part of the joint and by the provision of the recess 14 and tongue 15, the strength of the ring in the completed joint is substantially increased, as will be readily apparent. In addition, the provision of the tongue and recess provides means by which the ring may be accurately aligned with or centered over the joint 12 between the ends of the pipe sections 10 and 11. Thus when the ring is first placed over the ends of abutting pipe sections there will be sufficient space between the adjacent ends thereof and particularly between the end of the tongue 15 and the bottom of the recess 14 to observe the position of the ends of the pipe sections. It is therefore possible accurately to position the ring over the joint 12 by comparing the center of the tongue 15 with the joint.

One important advantage of the present apparatus for effecting pipe joints is in preliminarily positioning a number of pipe sections prior to effecting a permanent joint between any of the sections. Inasmuch as the split ring is sufficiently flexible to exert positive clamping pressure upon both ends of the adjacent pipe sections, it may be relied upon to retain the pipe sections in preliminary assembled relationship. It is therefore possible to assemble a large number of pipe sections, depending upon the split clamping ring to retain the pipe sections in assembled relationship. After the assembly has been completed and it is determined that the pipe sections are properly positioned and interrelated, joints may be effected by providing molten metal to effect the capillary flow previously referred to.

Preferably the inner corners of the clamping members 20 are scored as indicated at 25 in Figure 3. After the joint has been completed and the molten metal which has flowed between adjacent surfaces has set, the clamping screw 23 may be removed and the outwardly projecting ears 22 may be broken off by repeated bending. The score 25 facilitates the breaking of the ears and locates a line of weakness along which the ears will break. At the same time the provision of the score in the position described does not materially weaken the ears so as to deleteriously affect the clamping operation.

The present invention is applicable to a wide variety of materials and may be used to effect either soldered, brazed or welded joints, all as clearly set forth in my prior copending applications. For the purpose of clarity, however, it is pointed out here that the operation of brazing or soldering may be carried out by introducing molten brazing or soldering material along the edges of the ring in a manner to facilitate capillary flow of the molten metal between the outer surfaces of the abutting ends of the tube sections and the inner surface of the clamping ring. The abutting ends of the pipe sections are previously squared and brought into close surface to surface contact so that the capillary flow continues to the inner surfaces of the pipe sections. It is a characteristic of capillary flow that it will not extend beyond the surfaces which are in capillary relationship to each other so that the molten metal will not extend inwardly beyond the end surfaces of the pipe sections. Alternatively, instead of introducing soldering or brazing material at the edges of the ring, the molten material effecting capillary flow may be produced by applying a welding flame to the center of the ring in a manner to melt the material of the ring at the inner surface thereof and to thus effect a capillary flow of welding material.

By the modification in structure disclosed herein, the utility of the broad method illustrated and described in my prior copending applications is materially enlarged, and in fact by employing the teachings of the present invention it is applicable to substantially all commercial sizes of metal pipes and tubes irrespective of material. It may be mentioned that in forming tubes of certain materials referred to at the outset it is impractical to maintain tolerances at outside diameter within sufficiently close limits as to permit completion of joints of the type described with continuous rings. However, by the provision of the split adjustable clamping ring illustrated herein it is possible to effect the new and improved joint even though there may be substantial variation in outside diameters at the ends of the pipes or tube sections.

While there is illustrated and described in considerable detail a preferred embodiment of apparatus for effecting tube joints, it will be appreciated that this has been done merely to enable those skilled in the art to practice the invention, the truescope of which is indicated by the appended claims.

What I claim as my invention is:

1. A flexible, metal split ring for use in forming joints in thin-walled tubing and to become a permanent part of the joint, the ends of said ring having interfitting circumferentially extending portions, clamping ears adjacent the ends of said ring, and means extending between said ears for drawing the ends of said ring toward each other to clamp said ring tightly over the abutting ends of a pair of tube sections, said ring being formed of continuous smooth metal stock adapted to fit with capillary closeness to the exterior of the tube sections to be permanently united thereto by flow of metal therebetween.

2. A flexible, metal split ring for use in forming joints in thin-walled tubing and to become a permanent part of the joint, the ends of said ring having interfitting circumferentially extending tongue and recess portions, clamping ears adjacent the ends of said ring, and means extending between said ears for drawing the ends of said ring toward each other to clamp said ring tightly over the abutting ends of a pair of tube sections, said ring being formed of continuous smooth metal stock adapted to fit with capillary closeness to the exterior of the tube sections to be permanently united thereto by flow of metal therebetween.

3. A flexible, metal split ring for use in forming joints in thin-walled tubing and to become a permanent part of the joint, the ends of said ring having interfitting circumferentially extending portions, clamping ears adjacent the ends of said ring, and means extending between said ears for drawing the ends of said ring toward each other to clamp said ring tightly over the abutting ends of a pair of tube sections, said ring being formed of continuous smooth metal stock adapted to fit with capillary closeness to the exterior of the tube sections to be permanently united thereto by flow of metal therebetween, said ears being weakened to facilitate removal by bending after completion of the joint.

4. A flexible, metal split ring for use in forming joints in thin-walled tubing and to become a permanent part of the joint, the ends of said ring having interfitting circumferentially extending portions, clamping ears adjacent the ends of said ring, and means extending between said ears for drawing the ends of said ring toward each other to clamp said ring tightly over the abutting ends of a pair of tube sections, said ring being formed of continuous smooth metal stock adapted to fit with capillary closeness to the exterior of the tube sections to be permanently united thereto by flow of metal therebetween, said ears having weakening scores thereon to facilitate removal by bending after completion of the joint.

5. A flexible, metal split ring for use in forming joints in thin-walled tubing and to become a permanent part of the joint, the ends of said ring having interfitting circumferentially extending, symmetrically formed tongue and recess locating portions, clamping ears adjacent the ends of said ring, and means associated with said ears for drawing the ends of said ring toward each other to clamp said ring tightly over the abutting ends of a pair of tube sections, said ring being formed of continuous smooth metal stock adapted to fit with capillary closeness to the exterior of the tube sections to be permanently united thereto by flow of metal therebetween.

ALFRED C. ARBOGAST.

REFERENCES CITED

The following references are of record in the file of this patent:

UNITED STATES PATENTS

| Number | Name | Date |
|---|---|---|
| 1,345,543 | Muth | July 6, 1920 |
| 1,816,421 | Clark et al. | July 28, 1931 |
| 1,825,062 | Heaton et al. | Sept. 29, 1931 |
| 1,866,857 | Lindquist | July 12, 1932 |
| 2,050,728 | Ost | Aug. 11, 1936 |
| 2,269,664 | Hallerberg | Jan. 13, 1942 |